United States Patent
Abe et al.

(10) Patent No.: US 9,037,171 B2
(45) Date of Patent: May 19, 2015

(54) MOBILE STATION APPARATUS AND SIGNAL DETECTION AND CHANNEL ESTIMATION METHOD

(75) Inventors: Tetsushi Abe, Tokyo (JP); Alexander Tyrrell, Tokyo (JP); Auer Gunther, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 360 days.

(21) Appl. No.: 13/703,910

(22) PCT Filed: Jun. 10, 2011

(86) PCT No.: PCT/JP2011/063397
§ 371 (c)(1),
(2), (4) Date: Feb. 25, 2013

(87) PCT Pub. No.: WO2011/158757
PCT Pub. Date: Dec. 22, 2011

(65) Prior Publication Data
US 2013/0157704 A1 Jun. 20, 2013

(30) Foreign Application Priority Data
Jun. 15, 2010 (JP) ................. 2010-136446

(51) Int. Cl.
*H04B 7/00* (2006.01)
*H04W 24/02* (2009.01)
*H04J 11/00* (2006.01)
*H04L 25/02* (2006.01)
*H04L 25/06* (2006.01)
*H04W 36/20* (2009.01)
*H04W 36/28* (2009.01)
*H04B 7/04* (2006.01)

(52) U.S. Cl.
CPC .............. *H04W 24/02* (2013.01); *H04W 36/20* (2013.01); *H04W 36/28* (2013.01); *H04J 11/005* (2013.01); *H04L 25/0204* (2013.01); *H04L 25/067* (2013.01); *H04L 25/0202* (2013.01); *H04B 7/0413* (2013.01)

(58) Field of Classification Search
CPC ..... H04W 36/20; H04W 36/06; H04W 36/28; H04W 52/223; H04W 36/245
USPC ........... 455/501, 434, 435.1, 67.11, 423–425, 455/422.1, 403, 426.1, 426.2, 500, 517, 455/525, 524, 550.1, 67.16; 370/328, 329, 370/241, 343, 252
See application file for complete search history.

(56) References Cited

U.S. PATENT DOCUMENTS

2006/0128372 A1* 6/2006 Gazzola ......................... 455/424
2010/0008244 A1* 1/2010 Sampath et al. .............. 370/252

OTHER PUBLICATIONS

International Search Report issued in PCT/JP2011/063397 mailed Aug. 2, 2011 (4 pages).
3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).

* cited by examiner

Primary Examiner — Keith Ferguson
(74) Attorney, Agent, or Firm — Osha Liang LLP

(57) ABSTRACT

To cancel interference from the other cells and improve throughput characteristics without needing complicated processing, provided are a reception section that receives a reception signal including signal components from a plurality of base station apparatuses (BSs), and a signal detection and channel estimation section (61) that performs signal detection and channel estimation processing based on a factor graph on the reception signal, where the signal detection and channel estimation section (61) estimates interfering components from base station apparatuses of the other cells except a desired base station apparatus included in the reception signal at a symbol level, and reuses the interfering components in the signal detection and channel estimation processing based on the factor graph.

9 Claims, 10 Drawing Sheets

MOBILE STATION APPARATUS AND SIGNAL DETECTION AND CHANNEL ESTIMATION METHOD

TECHNICAL FIELD

The present invention relates to a mobile station apparatus and signal detection and channel estimation method.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied.

In the 3G system, a fixed band of 5 MHz is substantially used, and it is possible to achieve transmission rates of approximately maximum 2 Mbps in downlink. Meanwhile, in the LTE-scheme system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). For example, in LTE-A, it is scheduled to increase 20 MHz that is the maximum system band in LTE specifications to about 100 MHz. Further, it is scheduled to increase four antennas that are the maximum number of transmission antennas in LTE specification to eight antennas.

Moreover, in the LTE-scheme system, MIMO (Multi Input Multi Output) systems are proposed as radio communication techniques for transmitting and receiving data using a plurality of antennas and improving a data rate (spectral efficiency) (for example, see Non-patent Document 1). In the MIMO systems, Space Division Multiplexing (SDM) techniques are used in which using a plurality of transmission/reception antennas, a plurality of different transmission information sequences is transmitted at the same time with the same frequency. The receiver side exploits the fact that different fading variations occur in between transmission and reception antennas, and divides the simultaneously-transmitted information sequences to detect, and it is thereby possible to increase the data rate (spectral efficiency).

In such a MIMO system, since it is necessary to consider Multiple Access Interference (MAI), it is required to suitably estimate a state of a channel that is a propagation path.

CITATION LIST

Non-Patent Literature

[Non-patent Document 1] 3GPP TR 25.913 "Requirements for Evolved UTRA and Evolved UTRAN"

SUMMARY OF THE INVENTION

Technical Problem

In addition, in a cellular system to which a MIMO system is applied, a mobile station apparatus that is a receiver receives signals from not only a desired base station apparatus installed in a cell in which the mobile station apparatus is located, but also base station apparatuses installed in other cells including cells adjacent to the cell. In this case, signals from the base station apparatuses of other cells interfere with a signal from the desired base station apparatus, and become a factor for degrading throughput characteristics in the mobile station apparatus. To improve throughput characteristics in the MIMO system, it is necessary to cancel such interference from the other cells.

In addition, in the case of canceling interference from the other cells, from the viewpoint of improvements in throughput characteristics, it is not preferable that the processing required for interference cancellation is made complicated. This is because in the case that the processing required for interference cancellation is made complicated, it is expected that throughput characteristics deteriorate due to the processing.

The present invention was made in view of such circumstances, and it is an object of the invention to provide a mobile station apparatus and a signal detection and channel estimation method capable of canceling interference from the other cells and improving throughput characteristics without needing complicated processing.

Solution to Problem

A mobile station apparatus of the invention is characterized by having a reception section configured to receive a reception signal including signal components from a plurality of base station apparatuses, and a signal detection and channel estimation section configured to perform signal detection and channel estimation processing based on a factor graph on the reception signal, where the signal detection and channel estimation section estimates interfering components from base station apparatuses of other cells except a desired base station apparatus included in the reception signal at a symbol level, and reuses the interfering components in the signal detection and channel estimation processing based on the factor graph.

According to this configuration, since the interfering components from base station apparatuses of the other cells included in the reception signal are reused in the signal detection/channel estimation processing based on the factor graph, it is possible to perform signal detection and channel estimation while canceling interference from the other cells, and it is thereby possible to enhance channel estimation accuracy and signal detection accuracy of the reception signal. Further, since the interfering components from base station apparatuses of the other cells are estimated at a symbol level, and are reused in the signal detection/channel estimation processing based on the factor graph, it is possible to keep the processing required for cancellation of interference from the other cells to limited addition. As a result, without needing complicated processing, it is possible to cancel interference from the other cells and improve throughput characteristics.

A signal detection and channel estimation method of the invention is characterized by having the steps of receiving a reception signal including signal components from a plurality of base station apparatuses, and performing signal detection and channel estimation processing based on a factor graph on the reception signal, where interfering components from base station apparatuses of other cells except a desired base station apparatus included in the reception signal are estimated at a symbol level in the signal detection and channel estimation processing, and are reused in the signal detection and channel estimation processing based on the factor graph.

According to this method, since the interfering components from base station apparatuses of the other cells included in the reception signal are reused in the signal detection/channel estimation processing based on the factor graph, it is possible to perform signal detection and channel estimation while canceling interference from the other cells, and it is thereby possible to enhance channel estimation accuracy and signal detection accuracy of the reception signal. Further, since the interfering components from base station apparatuses of the other cells are estimated at a symbol level, and are reused in the signal detection/channel estimation processing based on the factor graph, it is possible to keep the processing required for cancellation of interference from the other cells to limited addition. As a result, without needing complicated processing, it is possible to cancel interference from the other cells and improve throughput characteristics.

Technical Advantage of the Invention

According to the invention, without needing complicated processing, it is possible to cancel interference from the other cells and improve throughput characteristics.

DESCRIPTION OF EMBODIMENTS

Figure 1:
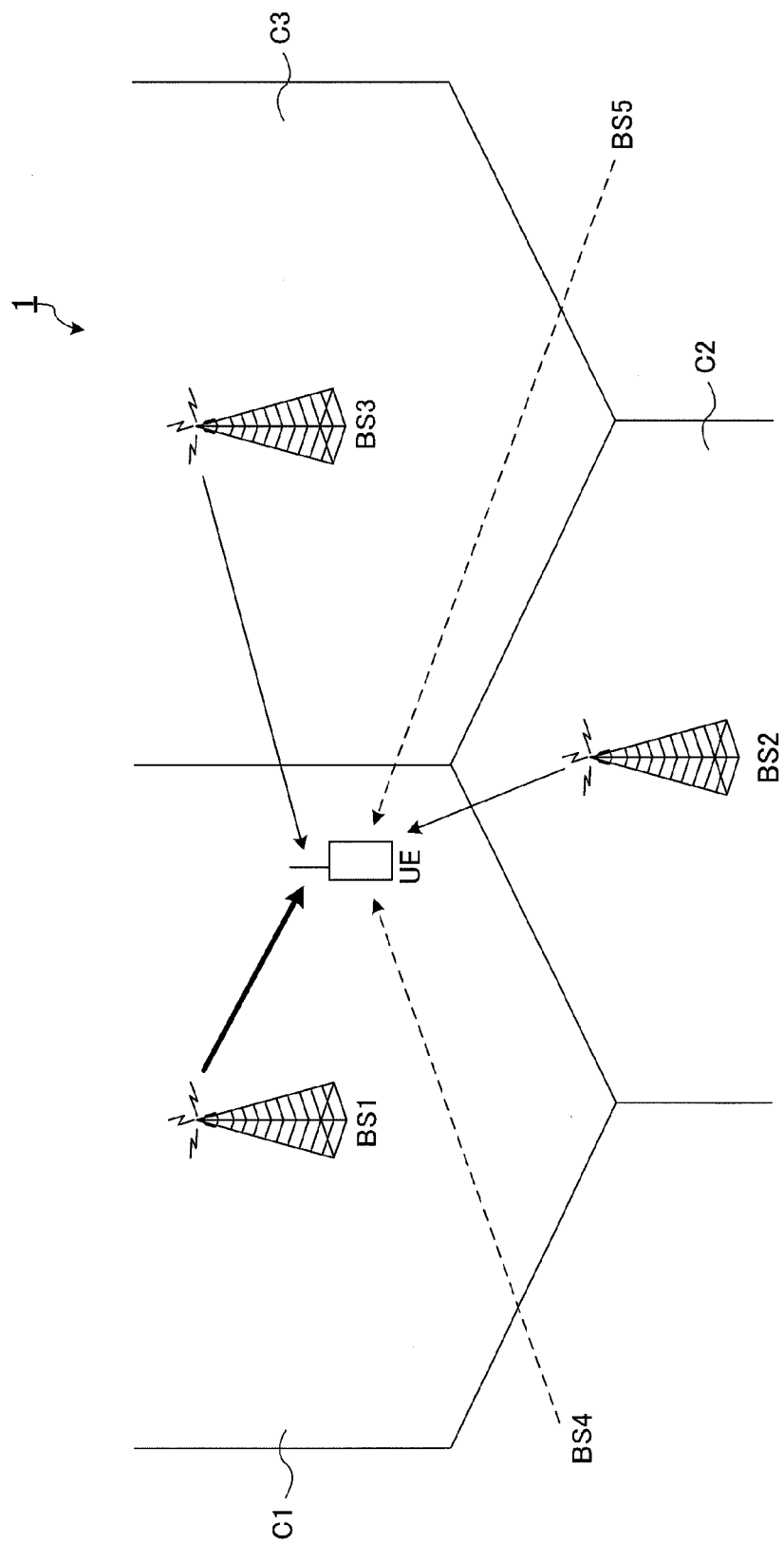
FIG. 1 is an explanatory view of a mobile communication system to which is applied a signal detection and channel estimation method according to one Embodiment of the invention.

One Embodiment of the invention will specifically be described below with reference to accompanying drawings. Described first is a mobile communication system to which is applied a channel estimation method according to the invention. FIG. 1 is an explanatory view of a mobile communication system to which is applied a signal detection and channel estimation method according to one Embodiment of the invention. In addition, in a mobile communication system 1 as shown in FIG. 1, shown are base station apparatuses BSs (BS1 to BS3) installed in three mutually adjacent cells Cs (C1 to C3) and a mobile station apparatus UE capable of communicating with the base station apparatuses BSs. The base station apparatuses BSs and mobile station apparatus UE are provided with a plurality of transmission/reception antennas, and are configured to be able to perform MIMO transmission for transmitting a plurality of different transmission information sequences at the same time with the same frequency using the transmission/reception antennas.

As shown in FIG. 1, the mobile station apparatus UE is located inside the cell C1, and performs radio communications via the base station apparatus BS1 that is a desired base station apparatus. In thus performing radio communications with the base station apparatus BS1, the mobile station apparatus UE receives signals from not only the base station apparatus BS1 but also base station apparatuses BS2 and BS3 of adjacent cells C2 and C3 and base station apparatuses BS4 and BS5 whose locations are unknown. The signals from base station apparatuses BS2 to BS5 of the other cells constitute interfering signals to a signal from the base station apparatus BS1, and become a factor for degrading throughput characteristics in the mobile station apparatus UE.

In addition, in the following description, for convenience in description, the base station apparatuses BS2 and BS3 installed in the adjacent cells C2 and C3 are called "adjacent base station apparatuses", and base station apparatuses BS4 and BS5 whose locations are unknown are called "unknown base station apparatuses". Further, the adjacent base station apparatuses and unknown base station apparatuses are collectively called "interfering base station apparatuses". In addition, the adjacent base station apparatus and unknown base station apparatus respectively constitute a first base station apparatus and second base station apparatus in the scope of claims.

A reception signal $y_n$ in the mobile station apparatus UE as shown in FIG. 1 can be expressed by (Eq.1).

$$y_n = h_{n,m}^{(1)} \cdot x_m^{(1)} + \underbrace{\sum_{\substack{i=1 \\ i \neq m}}^{N_S^{(1)}} h_{n,i}^{(1)} \cdot x_i^{(1)}}_{MAI} + \underbrace{\sum_{u=2}^{U-1} \sum_{i=1}^{N_S^{(u)}} h_{n,i}^{(u)} \cdot x_i^{(u)} + \sum_{i=1}^{N_S^{(U)}} h_{n,i}^{(U)} \cdot x_i^{(U)}}_{known\ and\ unknown\ ICI} + w_n \quad \text{(Eq. 1)}$$

Herein "n" represents an index of a reception antenna, and "m" represents an index of a transmission antenna. "h" represents a channel coefficient corresponding to a channel state, and "x" represents a data symbol of a transmission signal. "$N_s$" represents the number of transmission streams, "U" represents the total number of base station apparatuses BSs that perform signal transmission at the same time, and "$W_n$" represents AGWN. "MAI (Multiple Antenna Interference)" indicates interference among multiple access, and herein, indicates interference from streams except desired streams of the same base station apparatus, and "ICI (Inter-Carrier Interference)" indicates interference between carriers.

The first term in the right side in (Eq.1) indicates a signal from the base station apparatus BS1 that is the desired base station apparatus, and the second term indicates interference from the base station apparatus BS1. Further, the third term in the right side of (Eq.1) indicates a signal from an adjacent base station apparatus, the fourth term indicates a signal from an unknown base station apparatus, and the fifth term indicates a noise component in a channel. In (Eq.1), it is shown that the third term and four term constitute inter-carrier interference (ICI) constituting interfering components from the other cells. Further, inter-carrier interference based on a signal from the adjacent base station apparatus such that a position of a pilot signal can be grasped is indicated by "known ICI", and inter-carrier interference based on a signal from the unknown base station apparatus such that a position of a pilot signal cannot be grasped is indicated by "unknown ICI".

The GSCE (Graph-based Soft Channel Estimation) is studied as techniques for performing channel estimation and signal detection on such a reception signal in the same process. The GSCE uses characteristics of correlation in the time domain and frequency domain of a channel to perform soft estimation of a channel coefficient, while using redundancy in channel coding to reinforce information on the data symbol. In the GSCE, channel estimation and signal detection is performed on a reception signal based on a graph, called the factor graph, showing the relationship between nodes indicating the channel coefficient, transmission data symbol, reception data symbol and the like.

In addition, details of the GSCE are disclosed in "Graph-Based Iterative Gaussian Detection with Soft Channel Estimation for MIMO systems" Tianbin Wo., Chunhui Liu, and Peter Adam Hoeher, Information and Coding Theory Lab, Faculty of Engineering, University of Kiel, Germany, entire content of which is expressly incorporated by reference herein.

Figure 2:
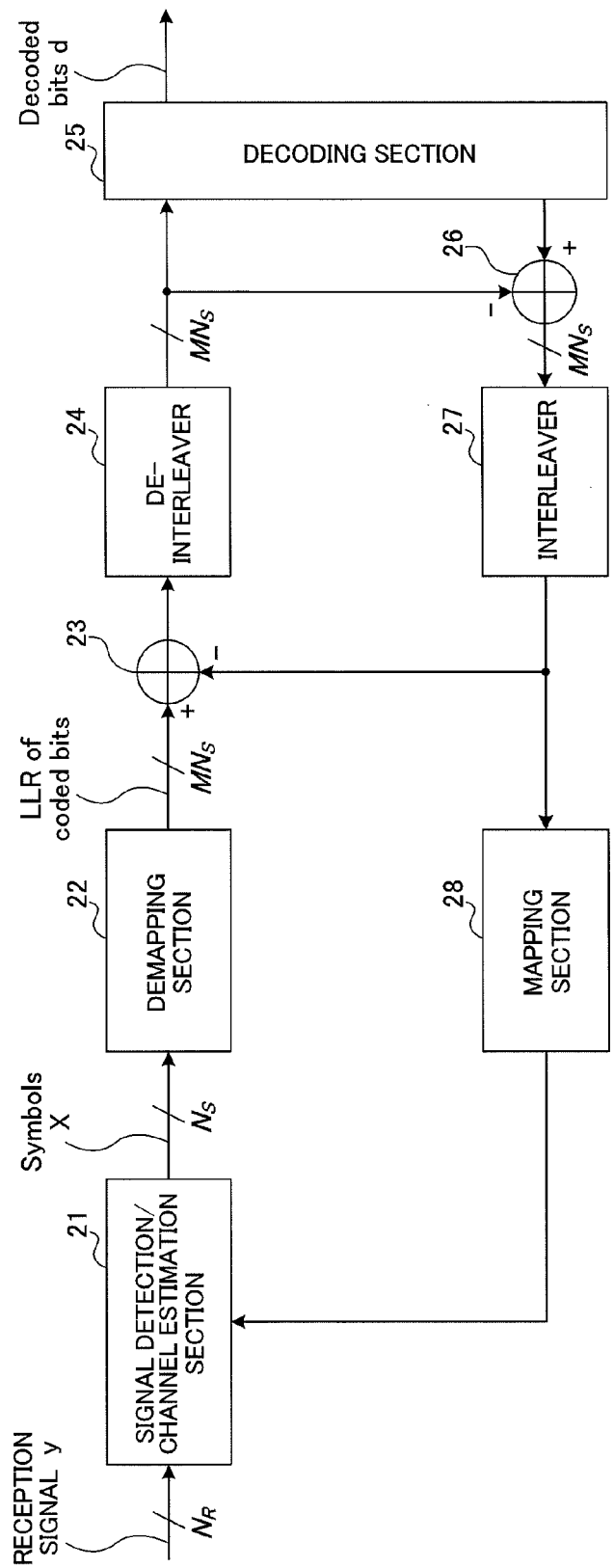
FIG. 2 is a block diagram of reception-series components of a mobile station apparatus UE with GSCE installed therein.

FIG. 2 is a block diagram of reception-series components of a mobile station apparatus UE with the GSCE installed therein. As shown in FIG. 2, a reception signal y arriving at the mobile station apparatus UE is input to a signal detection/channel estimation section 21, and is subjected to signal detection/channel estimation processing based on the factor graph. Described herein is the outline of the signal detection/channel estimation processing based on the factor graph.

Figure 3:
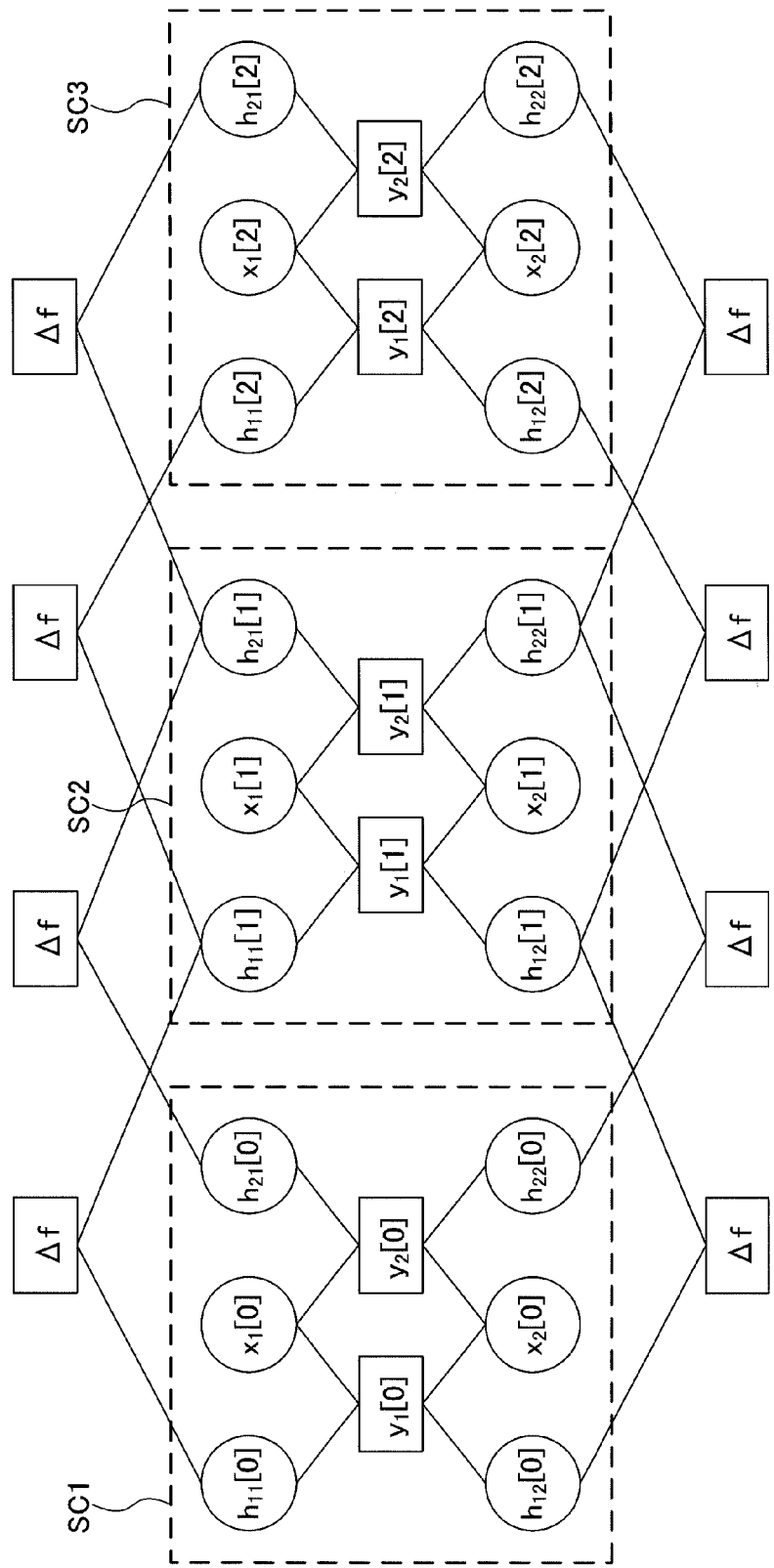
FIG. 3 is an explanatory view of a factor graph used in the GSCE.

FIG. 3 is an explanatory view of the factor graph used in the GSCE. In addition, in FIG. 3, each of the number ($N_s$) of transmission streams and the number ($N_R$) of reception antennas is "2", and FIG. 3 shows the factor graph associated with three subcarriers (SC1 to SC3 shown in FIG. 3). In FIG. 3, each of "$h_{11}[0]$", "$h_{12}[0]$" and the like indicates a channel coefficient node associated with a channel coefficient, and each of "$x_1[0]$", "$x_2[0]$" and the like indicates a symbol node associated with a transmission data symbol. Further, each of "$y_1[0]$", "$y_2[0]$" and the like indicates an observation node associated with a reception data symbol, and "Δ" indicates a Δ transfer node that couples channel coefficient nodes of adjacent subcarriers. In addition, as the Δ transfer node, there are a node (Δf) associated with correlation in the frequency domain in the channel, and a node (Δt) associated with correlation in the time domain in the channel, and for convenience in description, FIG. 3 shows only the Δ transfer node associated with correlation in the frequency domain.

The connection relationship in the factor graph indicates the dependence of each node. For example, a soft estimation value (soft channel estimation value) of the channel coefficient node $h_{11}[0]$ is estimated while being dependent on the observation node $y_1[0]$ and the channel coefficient node $h_{11}[1]$, and the soft estimation value (soft data estimation value) of the symbol node $x_1[0]$ is estimated while being dependent on the observation node $y_1[0]$ and the observation node $y_2[0]$. Further, for example, there is the dependence relationship between parameters such that the node $h_{11}[0]$ indirectly contributes to estimation of $x_1[0]$. In the factor graph, each node is updated based on statistical information (for example, average value and variance of the channel) of the channel. Then, the updated information is propagated through the graph, while being used further in updating the channel coefficient node and the symbol node. By repeating such an update and enhancing accuracy of the channel coefficient node and symbol node, channel estimation is made, while signal detection is performed.

In the factor graph, first, based on a pilot signal that is a known signal, a soft estimation value of the channel coefficient node is generated, while a soft data estimation vale of the symbol node is generated based on the soft channel estimation value of the channel coefficient node (training phase). In addition, the pilot signal is inserted in a particular symbol node. Then, after the soft channel estimation value is generated based on the soft data estimation value generated in the training phase, accuracy of the soft channel estimation value is improved based on channel correlation, while accuracy of the soft data estimation value is improved based on the improved soft channel estimation value (iterative phase). The iterative phase is repeated, and accuracy of each node is thereby improved. Then, in the process during which accuracy of each node is improved, interference is canceled, and it is possible to obtain a channel estimation value and signal detection value of high accuracy.

Figure 4:
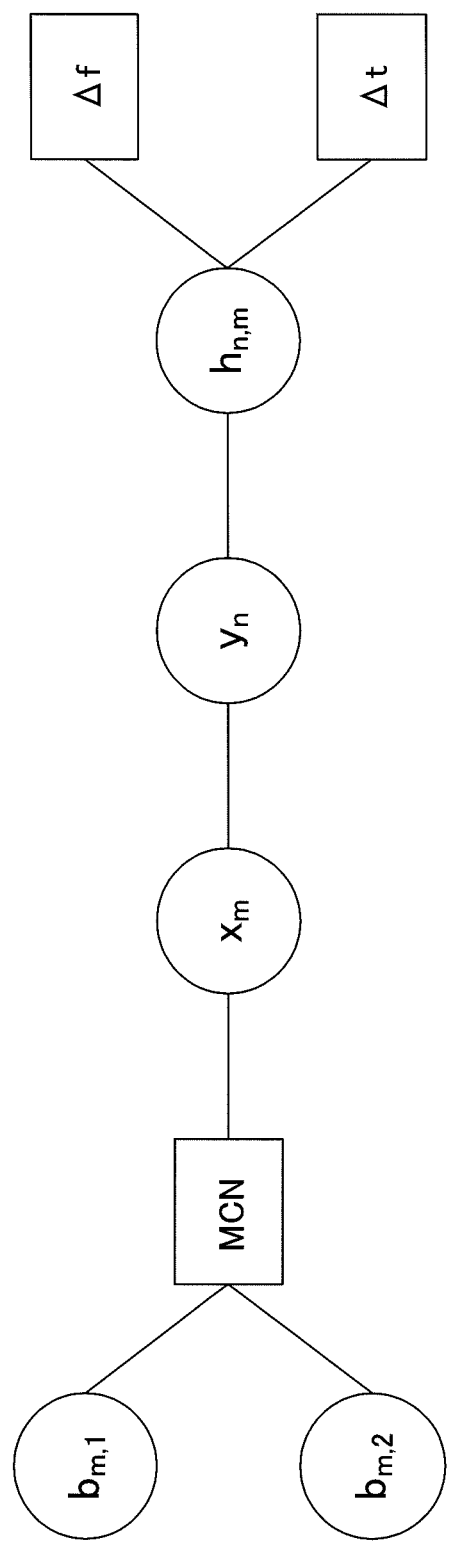
FIG. 4 is an explanatory view of the relationship between nodes in the factor graph.

FIG. 4 is an explanatory view of the relationship between nodes in such a factor graph. In addition, the algorithm using the GSCE is suitable for modulation schemes with higher modulation levels. FIG. 4 shows the relationship between nodes in the case where the modulation scheme in transmission data is QPSK (Quadrature Phase Shift Keying).

As shown in FIG. 4, a symbol node ($x_m$) is connected to transmission data bits ($b_{m,1}$, $b_{m,2}$) connected via a mapping check node (MCN) and the observation node ($y_n$), and has respective dependence relationships therewith. The observation node ($y_n$) is connected to the symbol node ($x_m$) and the channel coefficient node ($h_{n,m}$), and has dependence relationships with respective nodes. The channel coefficient node ($h_{n,m}$) is connected to the observation node ($y_n$) and the Δ transfer nodes (Δf, Δt), and has dependence relationships with respective nodes.

FIG. 5 contains explanatory views of a scheme of update among a part of nodes in the factor graph. Described herein is a scheme of update among the channel coefficient node ($h_{n,m}$), and the observation node ($y_n$) and the Δ transfer nodes (Δf, Δt) having the dependence relationship with the channel coefficient node ($h_{n,m}$).

Figures 5A, 5B:
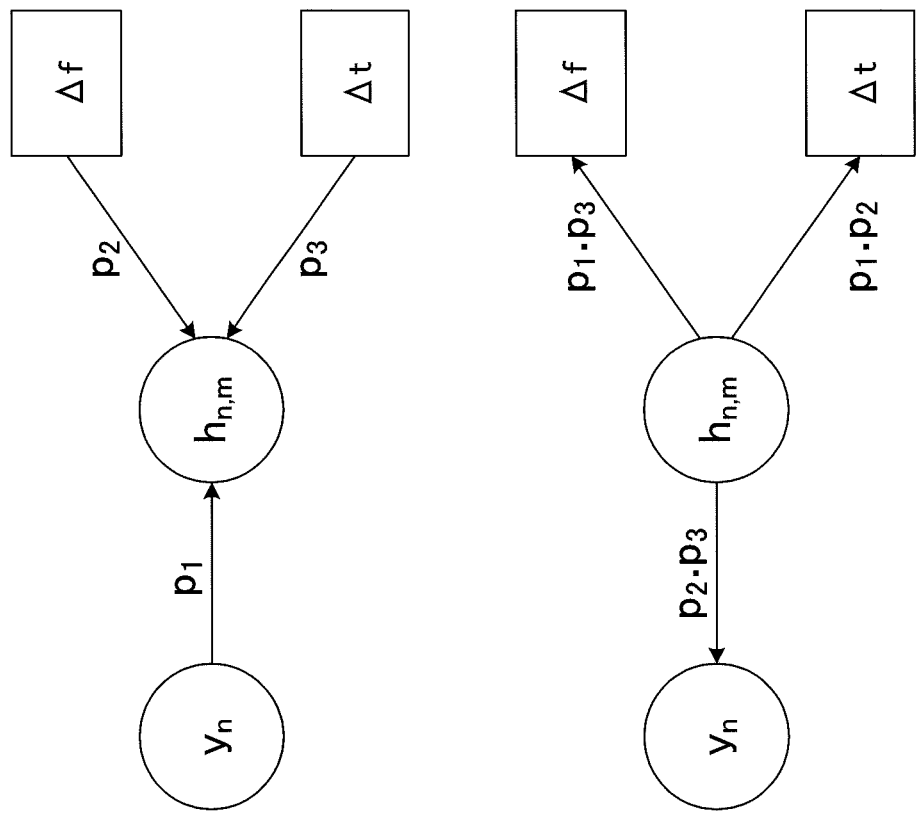
FIG. 5 contains explanatory views of a scheme of update among a part of nodes in the factor graph.

As shown in FIG. 5A, at some timing, the channel coefficient node ($h_{n,m}$) receives a statistical parameter (hereinafter, simply referred to as a "parameter") $p_1$ on the channel input from the observation node ($y_n$), receives a parameter $p_2$ input from the Δ transfer node (Δf), and further receives a parameter $p_3$ input from the Δ transfer node (Δt). These parameters $p_1$ to $p_3$ indicate the average value and variance of the channel. More specifically, the parameters $p_1$ to $p_3$ are expressed by Gaussian probability variables expressed (Eq.2) to (Eq.4), respectively.

$$p_1(h):h \sim CN(\mu_1, \sigma_1^2) \quad \text{(Eq.2)}$$

$$p_2(h):h \sim CN(\mu_2, \sigma_2^2) \quad \text{(Eq.3)}$$

$$p_3(h):h \sim CN(\mu_3, \sigma_3^2) \quad \text{(Eq.4)}$$

Herein, "$\mu_{h(1)\sim(3)}$" included in (Eq.2) to (Eq.4) corresponds to the average value of the channel, and "$\sigma_{h(1)\sim(3)}$" corresponds to the variance.

Upon receiving the parameters $p_1$ to $p_3$ as shown in FIG. 5A, as shown in FIG. 5B, in the channel coefficient node ($h_{n,m}$) new parameters (for example, a parameter $p_1 \cdot p_2$) are generated using the parameters $p_1$ to $p_3$. In addition, the newly generated parameter p (herein, the parameter $p_1 \cdot p_2$ output to the Δ transfer node (Δt)) is expressed by a Gaussian probability variable expressed by (Eq.5). The newly generated parameters p are output to the observation node ($y_n$) and the $\Delta$ transfer node ($\Delta f$).

$$p_1(h) \cdot p_2(h):h \sim CN(\mu_h, \sigma_h^2) \quad \text{(Eq.5)}$$

Herein, "$\mu_h$" and "$\sigma_h$" are respectively obtained by (Eq.6) and (Eq.7).

$$\mu_h = \frac{\sigma_2^2 \mu_1 + \sigma_1^2 \mu_2}{\sigma_1^2 + \sigma_2^2} \quad \text{(Eq. 6)}$$

$$\sigma_h^2 = \frac{\sigma_1^2 \sigma_2^2}{\sigma_1^2 + \sigma_2^2} \quad \text{(Eq. 7)}$$

In addition, the newly generated parameter p is obtained from parameters p input from different nodes. In other words, the new parameter p input to the $\Delta$ transfer node ($\Delta t$) that inputs the parameter $p_3$ to the channel coefficient node ($h_{n,m}$) is obtained from the parameters $p_1$ and $p_2$ that are input to the channel coefficient node ($h_{n,m}$) from the observation node ($y_n$) and the $\Delta$ transfer node ($\Delta f$).

Through such signal detection/channel estimation processing based on the factor graph, as shown in FIG. 2, a soft data symbol that is the soft data estimation value is output to a demapping section 22. By demapping processing in the demapping section 22, the LLR (Log Likelihood Ratio) of coded bits is obtained from the soft data symbol, and is output to an adder 23. An output value from an interleaver 27, described later, is subtracted from the LLR of the coded bits in the adder 23, and the resultant is output to a deinterleaver 24. Then, the resultant is rearranged randomly in the deinterleaver 24, and is subjected to decoding processing in a decoding section 25, and decoded bits are reproduced.

Meanwhile, the decoded bits obtained in the decoding section 25 are output to an adder 26. Then, an output value from the deinterleaver 24 is subtracted in the adder 26, and the resultant is output to the interleaver 27. The decoded bits rearranged randomly in the interleaver 27 are output to a mapping section 28. Then, a replica data symbol is obtained by mapping processing in the mapping section 28, and is sent back to the signal detection/channel estimation section 21 as feedback. The signal detection/channel estimation section 21 updates each node on the factor graph again based on the replica data symbol, and further enhances accuracy of the channel estimation value and signal detection value. In the mobile station apparatus UE thus using the GSCE, it is possible to perform channel estimating and signal detection of high accuracy on the reception signal.

However, in the GSCE, among the reception signal $y_n$ shown in (Eq.1), inter-carrier interference (ICI) shown in the third and fourth terms of the right side is handled in the same manner as in noise shown in the fifth term to perform channel estimation and signal detection. In other words, in the GSCE, channel estimation and signal detection is performed while regarding signals from the base station apparatuses BSs (base station apparatus BS2 to BS5 shown in FIG. 1) of the other cells as noise. Therefore, the signals interfere with the signal from the desired base station apparatus BS (base station apparatus BS1 shown in FIG. 1), and such an event may occur that it is not possible to improve throughput characteristics sufficiently.

Particularly, in the mobile communication system in which frequency repetition is not performed (i.e. frequency repetition is "1") as the LTE-A-scheme system, such an event is expected that it is not possible to improve accuracy of channel estimation and signal detection sufficiently. In such a mobile communication system, the mobile station apparatus UE requests to cancel interference from the other cells. Further, in the case of thus canceling interference from the other cells, from the viewpoint of improvements in throughput characteristics, it is requested to perform interference cancellation without requiring complicated processing. The inventor of the invention noted the respect that improvements in throughput characteristics are inhibited by thus performing channel estimation and signal detection while regarding interference from the other cells simply as noise, and arrived at the invention.

In other words, a channel estimation method according to the invention is to receive a reception signal including signal components from a plurality of base station apparatuses, estimate interfering components from base station apparatuses BSs of other cells except a desired base station apparatus BS included in the reception signal at a symbol level, and reuse the interfering components in the signal detection and channel estimation processing based on the factor graph.

According to the signal detection and channel estimation method according to the invention, since the interfering components from base station apparatuses BSs of the other cells included in the reception signal are reused in the signal detection and channel estimation processing based on the factor graph, it is possible to perform signal detection and channel estimation while canceling interference from the other cells, and it is thereby possible to enhance channel estimation accuracy and signal detection accuracy of the reception signal. Further, since the interfering components from base station apparatuses of the other cells are estimated at a symbol level, and are reused in the signal detection and channel estimation processing based on the factor graph, it is possible to keep the processing required for cancellation of interference from the other cells to limited addition. As a result, without needing complicated processing, it is possible to cancel interference from the other cells and improve throughput characteristics.

Figure 6:
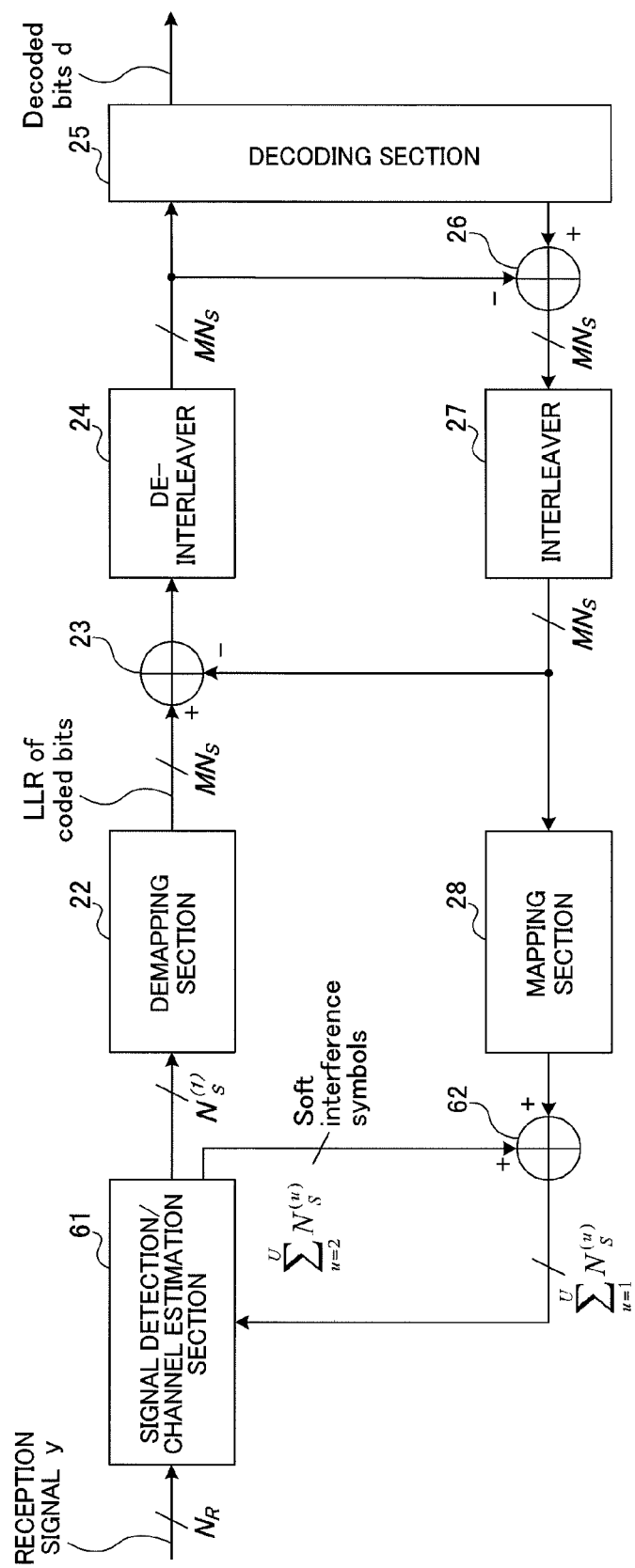
FIG. 6 is a block diagram of reception-series components of a mobile station apparatus to which is applied the signal detection and channel estimation method according to the Embodiment.

FIG. 6 is a block diagram of reception-series components of a mobile station apparatus UE to which is applied a signal detection and channel estimation method according to one Embodiment of the invention. The reception-series components of the mobile station apparatus UE as shown in FIG. 6 differ from reception-series components of the mobile station apparatus UE with the GSCE installed therein as shown in FIG. 2 in the respect of sending back soft interference symbols that are interfering components based on signals from the base station apparatuses BSs of the other cells included in the reception signal y to a signal detection/channel estimation section as feedback. In addition, in FIG. 6, the structural components common to FIG. 2 are assigned the same reference numerals, and the descriptions thereof are omitted or simplified.

As shown in FIG. 6, the mobile station apparatus UE according to this Embodiment has a signal detection/channel estimation section 61 and adder 62, and in this respect, differs from the mobile station apparatus UE as shown in FIG. 2. The signal detection/channel estimation section 61 and adder 62 will be described below. In the following description, for convenience in description, the mobile station apparatus UE according to this Embodiment is assumed to be located in the cellular environment as shown in FIG. 1. In other words, for the mobile station apparatus UE, the base station apparatus BS1 is a desired base station apparatus, the base station apparatuses BS2 and BS3 are adjacent base station apparatuses, and the base station apparatuses BS4 and BS5 are unknown base station apparatuses.

The signal detection/channel estimation section 61 receives a reception signal y including signal components from a plurality of base station apparatuses BSs (herein, which are assumed to be the base station apparatuses BS1 to BS5) from a reception section, not shown. The signal detection/channel estimation section 61 performs channel estimation of channels with all the base station apparatuses BSs from the reception signal y, while detecting signals included in the reception signal y. As in the signal detection/channel estimation section 21 as shown in FIG. 2, the signal detection/channel estimation processing based on the factor graph is used in the channel estimation and signal detection on the reception signal y. In addition, the signal detection/channel estimation section 61 differs from the signal detection/channel estimation section 21 as shown in FIG. 2 in the respect of performing the signal detection/channel estimation processing based on the factor graph, based on a replica data symbol (described later) including soft interference symbols output from the adder 62.

Further, the signal detection/channel estimation section 61 differs from the signal detection/channel estimation section 21 as shown in FIG. 2 in the respect of estimating a soft data symbol from the base station apparatus BS1 and soft interference symbols based on signals from the base station apparatuses BS2 to BS5 except the base station apparatus BS1 from the reception signal y. The signal detection/channel estimation section 61 outputs a soft data symbol to the demapping section 22, while outputting soft interference symbols to the adder 62.

The adder 62 adds the soft interference symbols input from the signal detection/channel estimation section 61 to the replica data symbol input from the mapping section 28. By this means, a replica data symbol including the soft interference symbols is generated. Then, the adder 62 outputs the replica data symbol including the soft interference symbols to the signal detection/channel estimation section 61.

Figure 7:
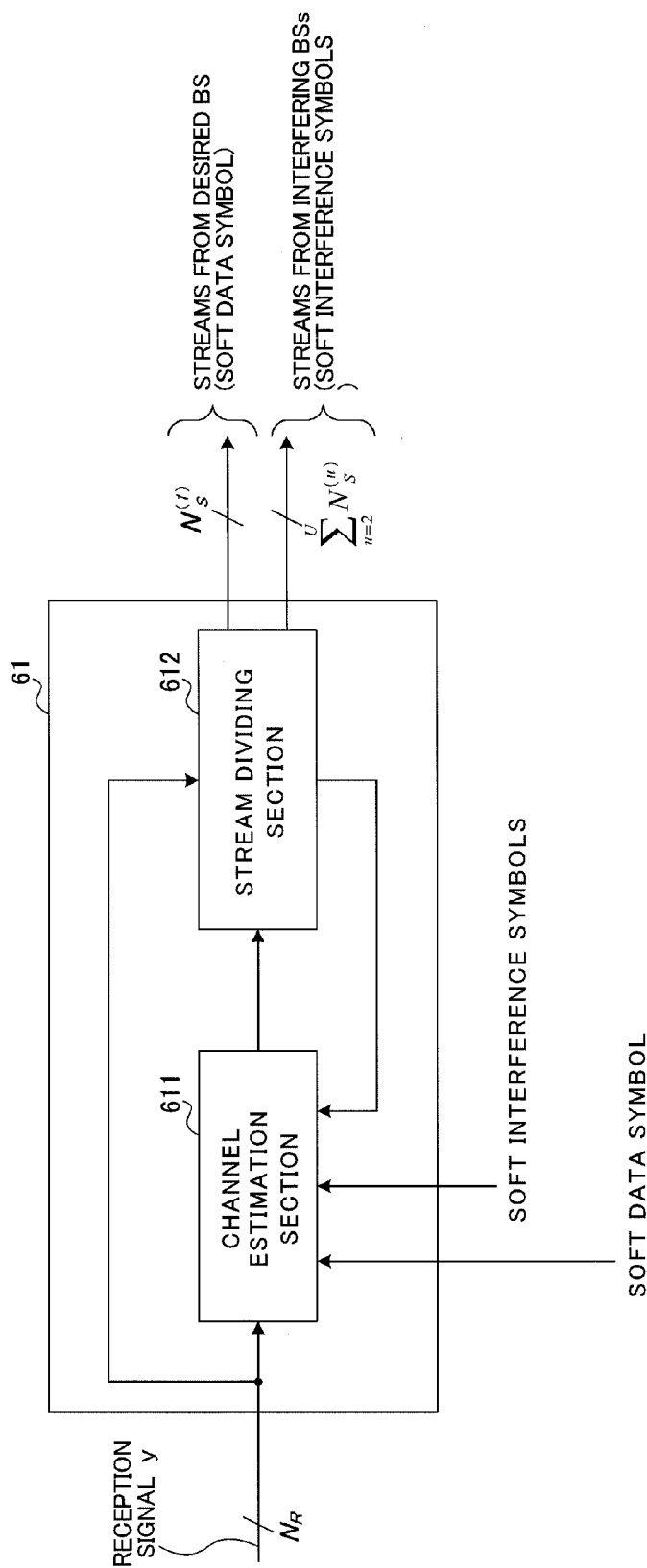
FIG. 7 is a functional block diagram of a signal detection/channel estimation section of the mobile station apparatus according to the Embodiment.

FIG. 7 is a functional block diagram of the signal detection/channel estimation section 61. As shown in FIG. 7, the signal detection/channel estimation section 61 is provided with a channel estimation section 611 and stream dividing section 612, and by causing the sections to cooperate, performs the signal detection/channel estimation processing based on the factor graph.

The channel estimation section 611 performs channel estimation on channels with the base station apparatuses BS1 to BS5 from the reception signal y. More specifically, based on the reception signal y, the section 611 generates the factor graph, updates each kind of node included in the factor graph as appropriate, and obtains the channel estimation value (more specifically, channel coefficient node ($h_{n,m}$)) of each node. In this case, the channel estimation section 611 uses all soft data symbols and soft interference symbols output from the stream dividing section 612 as feedback and the replica data symbol including the interference symbols output from the adder 62 in updating each node. Then, the section 611 outputs respective channel estimation values to the stream dividing section 612.

Using the factor graph, the stream dividing section 612 divides the reception signal y into streams from the base station apparatus BS1 and streams from the base station apparatuses BS2 to BS5, based on each channel estimation value input from the channel estimation section 611. Thus divided streams from the base station apparatus BS1 constitute a soft data symbol from the base station apparatus BS1 (desired base station apparatus), and the streams from the base station apparatuses BS2 to BS5 constitute soft interference symbols from the base station apparatuses BS2 to BS5 (interfering base station apparatuses). In other words, the stream dividing section 612 has the function (signal detection function) of detecting the soft data symbol and soft interference symbols by dividing the reception signal y.

Figure 8:
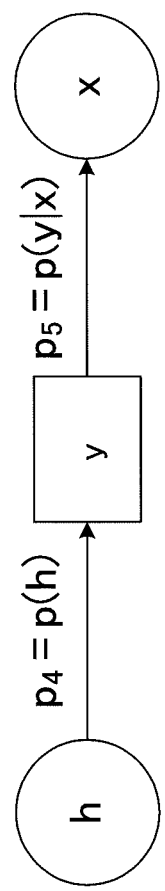
FIG. 8 is a diagram to explain the signal detection function in a stream dividing section in the signal detection/channel estimation section of the mobile station apparatus according to the Embodiment.

Herein, the signal detection function of the stream dividing section 612 will be described with reference to FIG. 8. FIG. 8 is a diagram to explain the signal detection function in the stream dividing section 612. FIG. 8 shows the channel coefficient node (h) and symbol node (x) each having the dependence relationship with the observation node (y). Herein, a parameter $p_4$ is input to the observation node (y) from the channel coefficient node (h) at some timing, and a parameter $p_5$ is input to the symbol node (x) from the observation node (y). Herein, the parameter $p_4$ indicates the occurrence probability p(h) of the channel coefficient node (h), and corresponds to a soft channel estimation value. Meanwhile, the parameter $p_5$ indicates the occurrence probability p(y|x) of the observation node (y) with the condition that the symbol node (x) is given, and corresponds to a soft data symbol.

Herein, p(y|x) is obtained from (Eq.8). In addition, for "$\mu_h$" and "$\sigma_h$", (Eq.6) and (Eq.7) are referred to.

$$p(y|x) = \int p(y|h,x)p(h)dh \qquad \text{(Eq. 8)}$$

$$= \int \frac{1}{\pi\sigma_v^2}\exp\left(-\frac{|y-hx-\mu_v|^2}{\sigma_v^2}\right) \cdot$$

$$\frac{1}{\pi\sigma_h^2}\exp\left(-\frac{|h-\mu_h|^2}{\sigma_h^2}\right)dh$$

$$= \frac{1}{\pi(\sigma_h^2|x|^2+\sigma_v^2)}\exp\left(-\frac{|y-\mu_h x-\mu_v|^2}{\sigma_h^2|x|^2+\sigma_v^2}\right)$$

When the soft data symbol is represented by p(y|x), the soft interference symbol is represented by the occurrence probability p(x|y) of the symbol node (x) with the condition that the observation node (y) is given. Herein, p(x|y) is obtained based on Bayes' theorem from (Eq.9).

$$p(x|y)=p(y|x)*p(x)/p(y) \qquad \text{(Eq.9)}$$

The stream dividing section 612 performs operations of above-mentioned (Eq.8) and (Eq.9) based on the reception signal y, and thereby estimates the soft data symbol and soft interference symbols. The soft data symbol estimated in the stream dividing section 612 is output to the demapping section 22 as shown in FIG. 6, and the soft interference symbols are output to the adder 62. Further, the soft data symbol and soft interference symbols are sent back to the channel estimation section 611 as feedback. Based on the soft data symbol and soft interference symbols thus subjected to feedback, the channel estimation section 611 updates each kind of node of the factor graph repeatedly, and accuracy of the soft estimation values to the nodes are thereby enhanced.

As in the mobile station apparatus UE as shown in FIG. 2, for the soft data symbol input to the demapping section 22, the LLR of coded bits is obtained from the soft data symbol by the demapping processing, and is output to the adder 23. An output value from the interleaver 27 is subtracted from the LLR of the coded bits in the adder 23, and the resultant is output to the deinterleaver 24. Then, the resultant is rearranged randomly in the deinterleaver 24, and is subjected to decoding processing in the decoding section 25, and decoded bits are reproduced.

Meanwhile, the decoded bits obtained in the decoding section 25 are output to the adder 26. Then, an output value from the deinterleaver 24 is subtracted in the adder 26, and the resultant is output to the interleaver 27. The decoded bits rearranged randomly in the interleaver 27 are output to the mapping section 28. Then, a replica data symbol is obtained by mapping processing in the mapping section 28, and is output to the adder 62. The adder 62 adds the soft interference symbols input from the signal detection/channel estimation section 61 to the replica data symbol to output to the signal detection/channel estimation section 61. Based on the replica data symbol including the soft interference symbols, the signal detection/channel estimation section 61 updates each node in the factor graph again, and further enhances accuracy of the channel estimation value and signal detection value.

In other words, the mobile station apparatus UE according to this Embodiment estimates interfering components from base station apparatuses BSs of the other cells included in the reception signal y at a symbol level, reuses the interfering components (soft interference symbols) in the signal detection/channel estimation processing based on the factor graph, is thereby capable of performing signal detection and channel estimation while canceling interference from the other cells, and is capable of enhancing channel estimation accuracy and signal detection accuracy on the reception signal. By this means, it is possible to effectively cancel interference from the other cells and improve throughput characteristics.

Further, the mobile station apparatus UE according to this Embodiment uses the soft data symbol in the signal detection/channel estimation processing at a bit level, while using the soft interference symbols in the signal detection/channel estimation processing at a symbol level. In other words, since the soft interference symbols used in cancellation of interference from the other cells are used in the signal detection/channel estimation processing at a symbol level, it is possible to keep the processing required for cancellation of interference from the other cells to limited addition. As a result, without needing complicated processing, it is possible to cancel interference from the other cells and improve throughput characteristics.

Generally, the mobile station apparatus UE is not able to grasp information of modulation scheme and the like of signals from base station apparatuses of the other cells. Therefore, the demapping 22 is not able to perform the demapping processing properly. However, in the mobile station apparatus UE according to this Embodiment, since interfering components based on signals from base station apparatuses of the other cells are used in the signal detection/channel estimation processing at a symbol level, it is possible to cancel interference from the other cells without requiring the modulation schemes and the like of signals from the base station apparatuses.

Figure 9:
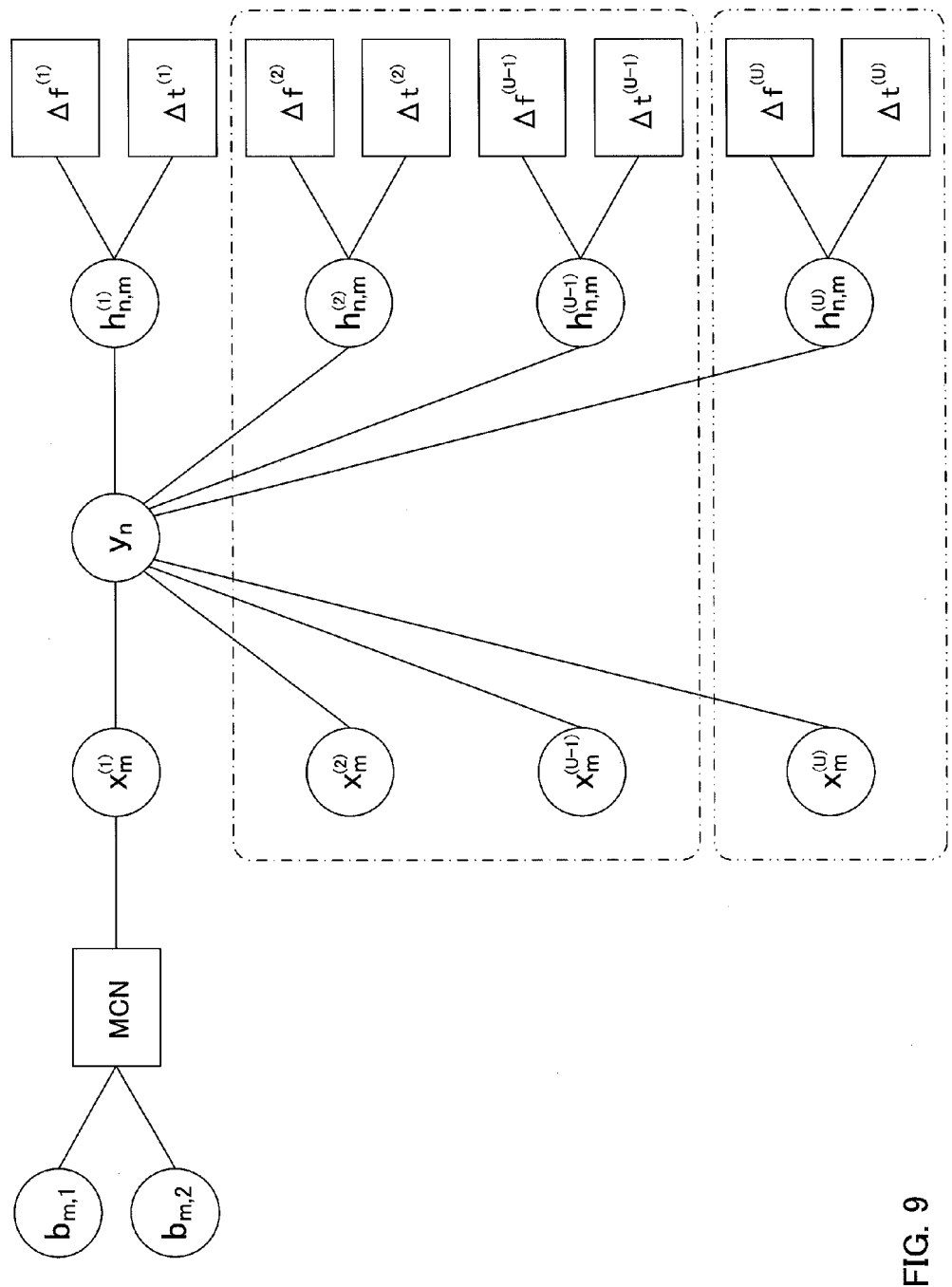
FIG. 9 is an explanatory view of the relationship between nodes in the factor graph generated in the mobile station apparatus according to the Embodiment.

Described herein is a method of canceling interference from adjacent base station apparatuses in the mobile station apparatus UE according to this Embodiment. FIG. 9 is an explanatory view of the relationship between nodes in the factor graph generated in the mobile station apparatus UE according to this Embodiment. In FIG. 9, nodes associated with adjacent base station apparatuses are shown in a region enclosed by alternate long and short dashed lines, and nodes associated with an unknown base station apparatus are shown in a region enclosed by chain double-dashed lines. In addition, as in FIG. 4, FIG. 9 shows the relationship between nodes in the case that the modulation scheme in the transmission data is QPSK.

As shown in FIG. 9, a symbol node ($x_m^{(1)}$) is connected to transmission data bits ($b_{m,1}$, $b_{m,2}$) connected via a mapping check node (MCN) and an observation node ($y_n$), and has respective dependence relationships therewith. A channel coefficient node ($h_{n,m}^{(1)}$) is connected to the observation node ($y_n$) and Δ transfer nodes ($\Delta f^{(1)}$, $\Delta t^{(1)}$) and has dependence relationships with respective nodes.

The observation node ($y_n$) is connected to the symbol node ($x_m^{(1)}$) and channel coefficient node ($h_{n,m}^{(1)}$), and has dependence relationships with respective nodes. Further, the observation node ($y_n$) is connected to symbol nodes ($x_m^{(2)\sim(U-1)}$) and channel coefficient nodes ($h_{n,m}^{(2)\sim(U-1)}$) associated with adjacent base station apparatuses, and has dependence relationships with respective nodes. Furthermore, the observation node ($y_n$) is connected to a symbol node ($x_m^{(U)}$) and channel coefficient node ($h_{n,m}^{(U)}$) associated with an unknown base station apparatus, and has dependence relationships with respective nodes.

In addition, the channel coefficient node ($h_{n,m}^{(2)}$) associated with the base station apparatus BS2 that is an adjacent base station apparatus is connected to the observation node ($y_n$) and Δ transfer nodes ($\Delta f^{(2)}$, $\Delta t^{(2)}$), and has dependence relationships with respective nodes. Channel coefficient nodes ($h_{n,m}^{(3)\sim(U-1)}$) associated with the other adjacent base station apparatuses are in the same manner. Further, the channel coefficient node ($h_{n,m}^{(U)}$) associated with the base station apparatus BSU that is an unknown base station apparatus is connected to the observation node ($y_n$) and L transfer nodes ($\Delta f^{(U)}$, $\Delta t^{(U)}$), and has dependence relationships with respective nodes.

Figure 10B:
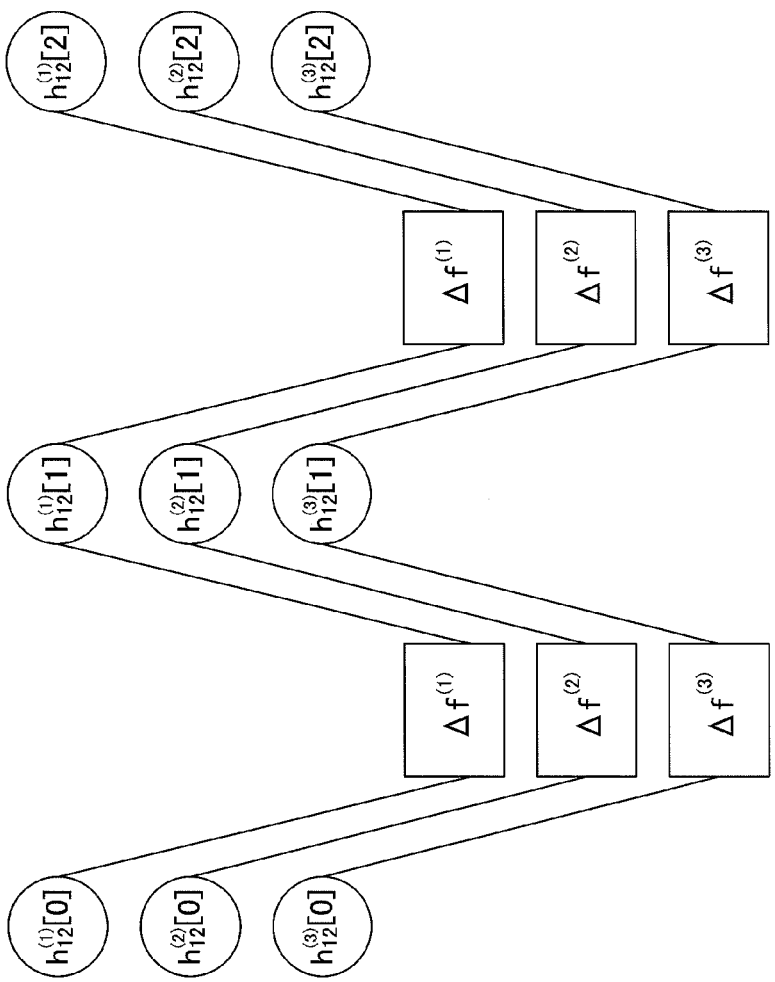
FIG. 10 contains diagrams showing an example of the factor graph generated in the mobile station apparatus according to the Embodiment.
Figure 10A:
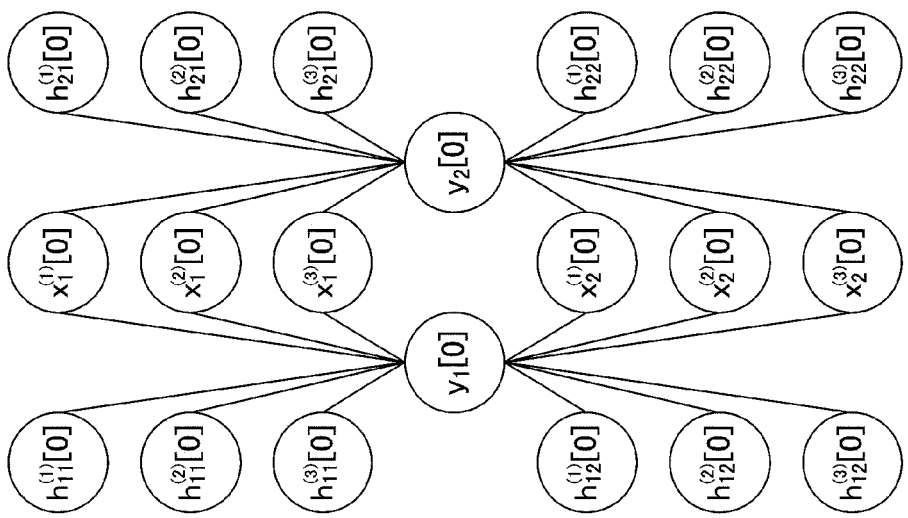

FIG. 10 contains diagrams showing an example of the factor graph generated in the mobile station apparatus UE according to this Embodiment. FIG. 10A shows the relationship between channel coefficient nodes ($h_{n,m}^{(1)\sim(3)}$) and symbol nodes ($x_m^{(1)\sim(3)}$) associated with base station apparatuses BS1 to BS3 and the observation node ($y_n$). FIG. 10B shows the relationship between Δ transfer nodes ($\Delta f^{(1)\sim(3)}$) associated with base station apparatuses BS1 to BS3 and channel coefficient nodes ($h_{n,m}^{(1)\sim(3)}$) of adjacent subcarriers. In addition, in FIG. 10, for convenience in description, each node associated with an unknown base station apparatus is omitted. Further, three base station apparatuses BS1 to BS3 may be interpreted as three antennas of the same base station.

Since the base station apparatuses BS2 and BS3 are adjacent base station apparatuses, the mobile station apparatus UE is capable of grasping positions of pilot signals from the base station apparatuses BS2 and BS3. Therefore, as in a pilot signal of the base station apparatus BS1, the signal detection/channel estimation section 61 uses the pilot signals in the training phase of the factor graph. In other words, in the factor graph, based on the pilot signals, a soft channel estimation value of the channel coefficient node is generated, while a soft data estimation vale of the symbol node is generated based on the soft estimation value of the channel coefficient node. Then, after the soft channel estimation value is generated based on the soft data estimation value generated in the training phase, accuracy of the soft channel estimation value is improved based on channel correlation, while accuracy of the soft data estimation value is improved based on the improved soft channel estimation value (iterative phase). The iterative phase is repeated, and accuracy of each node is thereby improved. Then, in the process during which accuracy of each node is improved, interference from the base station apparatuses BS2 and BS3 is canceled.

It is assumed that the symbol node ($x_2^{(1)}[0]$) as shown in FIG. 10A is a pilot signal of the base station apparatus BS1, the symbol node ($x_2^{(2)}[0]$) is a pilot signal of the base station apparatus BS2, and that the symbol node ($x_2^{(3)}[0]$) is a pilot signal of the base station apparatus BS3. In this case, in the training phase, based on the pilot signals and observation node $y_1[0]$, soft channel estimation values of channel coefficient nodes $h_{12}^{(1)}[0]$, $h_{12}^{(2)}[0]$ and $h_{12}^{(3)}[0]$ are generated.

Further, based on the pilot signals and observation node $y_2[0]$, soft channel estimation values of channel coefficient nodes $h_{22}^{(1)}[0]$, $h_{22}^{(2)}[0]$ and $h_{22}^{(3)}[0]$ are generated.

Subsequently, in the training phase, soft data estimation values of the symbol nodes are generated based on the soft channel estimation values. As shown in FIG. 10B, the channel coefficient nodes $h_{12}^{(1)}[0]$, $h_{12}^{(2)}[0]$ and $h_{12}^{(3)}[0]$ are connected to channel coefficient nodes $h_{12}^{(1)}[1]$, $h_{12}^{(2)}[1]$ and $h_{12}^{(3)}[1]$ in an adjacent subcarrier (herein, assumed to subcarrier 1) via $\Delta$ transfer nodes $\Delta f^{(1)}$, $\Delta f^{(2)}$ and $\Delta f^{(3)}$. The $\Delta$ transfer nodes $\Delta f^{(1)}$, $\Delta f^{(2)}$ and $\Delta f^{(3)}$ are capable of being grasped from the interval of subcarriers with accuracy of some extent. Therefore, soft channel estimation values of channel coefficient nodes $h_{12}^{(1)}[1]$, $h_{12}^{(2)}[1]$ and $h_{12}^{(3)}[1]$ are generated. In generation of the soft data estimation values in the above-mentioned training phase, for example, soft data estimation values of symbol nodes $x_2^{(1)}[1]$, $x_2^{(2)}[1]$ and $x_2^{(3)}[1]$, not shown, are generated based on the soft channel estimation values of the channel coefficient nodes $h_{12}^{(1)}[1]$, $h_{12}^{(2)}[1]$ and $h_{12}^{(3)}[1]$ and an observation node $y_1[1]$ in subcarrier 1, not shown.

By the iterative phase being repeated after such a training phase is performed, the channel coefficient node $(h_{n,m})$ and symbol node $(x_m)$ are updated, and accuracy thereof is improved. Then, in the process during which accuracy of each node is improved, interference from the base station apparatuses BS2 and BS3 is canceled. Thus, the mobile station apparatus UE according to this Embodiment cancels interfering components from adjacent base station apparatuses such that the position of the pilot signal can be grasped among base station apparatuses of the other cells in the process of the signal detection and channel estimation processing based on the factor graph, and is thereby capable of efficiently canceling interference from the adjacent base station apparatuses in parallel with the signal detection/channel estimation processing based on the signal from the desired base station apparatus.

Thus, in the mobile station apparatus UE according to this Embodiment, it is possible to cancel interference from all adjacent base station apparatuses. However, in the case of canceling interference from all adjacent base station apparatuses, loads of factor graph generation processing are excessively large in the signal detection/channel estimation section 61, and as a result, such an event may occur that throughput characteristics deteriorate. Therefore, the mobile station apparatus UE according to this Embodiment is configured to cancel only interference from a part of adjacent base station apparatuses.

In the signal detection/channel estimation section 61, for example, by the setting in the manufacturing stage, or instructions from a user or communication carrier, it is possible to limit the number of nodes based on signals from adjacent base station apparatuses BSs among nodes constituting the factor graph. In the signal detection/channel estimation section 61, for example, in the case where five adjacent base station apparatuses BSs exist, by limiting the number of nodes based on signals from the adjacent base station apparatuses BSs, it is possible to designate "3" as the number of adjacent base station apparatuses targeted for the factor graph generation processing. The loads of the factor graph generation processing increase basically corresponding to the total number of base station apparatuses targeted for the generation processing. By limiting the number of nodes constituting the factor graph as described above, it is possible to decrease the total number of base station apparatuses targeted for the generation processing, it is thereby possible to reduce the loads of the factor graph generation processing, and it is thus possible to prevent the occurrence of an event that throughput characteristics deteriorate due to the loads of the generation processing.

In addition, described herein is the case of reducing the loads of the factor graph generation processing in the signal detection/channel estimation section 61 by limiting the number of nodes constituting the factor graph. However, the configuration for reducing the loads of the factor graph generation processing in the signal detection/channel estimation section 61 is not limited thereto, and is capable of being modified as appropriate.

Described next is a method of canceling interference from an unknown base station apparatus in the mobile station apparatus UE according to this Embodiment. As described above, by the signal detection/channel estimation processing based on the factor graph, the mobile station apparatus UE detects the signal from the base station apparatus BS1 that is a desired base station apparatus, while being capable of canceling interference from the base station apparatuses BS2 and BS3 that are adjacent base station apparatuses. Therefore, signal components that are not estimated in the reception signal in the mobile station apparatus UE are limited to interference from the unknown base station apparatus and noise component in the channel.

The mobile station apparatus UE according to this Embodiment estimates such an interfering component from the unknown base station apparatus, e.g. interfering power and correlation matrix, based on correlation in the time domain and frequency domain in the channel, and uses the resultant in interference cancellation. As descried above, the signal detection/channel estimation section 61 has the function of detecting the signal from the desired base station apparatus, while estimating interference from the unknown base station apparatus from the noise component based on correction in the time domain and frequency domain in the channel after canceling interference from the adjacent base station apparatuses and canceling the interference. Thus, the mobile station apparatus UE according to this Embodiment estimates an interfering component from an unknown base station apparatus such that the position of the pilot signal cannot be grasped among base station apparatuses of the other cells, from the noise component based on correlation in the time domain and frequency domain in the channel, to cancel the interfering component, and therefore, is capable of effectively canceling interference from the unknown base station apparatus without requiring the modulation scheme and the like.

Thus, in the mobile station apparatus UE according to this Embodiment, it is possible to cancel interference from an unknown base station apparatus. However, in the mobile station apparatus UE, from the nature of the unknown base station apparatus, it is difficult to grasp the number of apparatuses correctly. In this case, when many unknown base station apparatuses exist, such an event may occur that the number of nodes in the factor graph extremely increases. In this case, loads of factor graph generation processing are excessively large in the signal detection/channel estimation section 61, and as a result, such an event may occur that throughput characteristics deteriorate. Therefore, the mobile station apparatus UE according to this Embodiment is configured to standardize each node of the factor graph corresponding to the unknown base station apparatus.

In the signal detection/channel estimation section 61, for example, by the setting in the manufacturing stage, or instructions from a user or communication carrier, it is possible to standardize estimation values of $\Delta$ transfer nodes associated with unknown base station apparatuses in the factor graph. As an estimation value standardized in the Δ transfer node, for example, a first estimated estimation value is considered. In other words, the first estimated estimation value is regarded as estimation values of Δ transfer nodes associated with all unknown base station apparatuses. In this case, it is possible to update each node by regarding the Δ transfer nodes associated with the unknown base station apparatuses in the factor graph as a fixed value, it is thereby possible to reduce the loads of the factor graph generation processing, and it is thus possible to prevent the occurrence of an event that throughput characteristics deteriorate due to the loads of the generation processing. In addition, herein, as a node to standardize, the Δ transfer node is exemplified, but it is possible to standardize other nodes.

As described above, according to the mobile station apparatus UE to which is applied the channel estimation method according to this Embodiment, since the interfering components from base station apparatuses of the other cells included in the reception signal are reused in the signal detection and channel estimation processing based on the factor graph, it is possible to perform signal detection and channel estimation while canceling interference from the other cells, and it is thereby possible to enhance channel estimation accuracy and signal detection accuracy of the reception signal. Further, since the interfering components are estimated at a symbol level, and are reused in the signal detection/channel estimation processing based on the factor graph, it is possible to keep the processing required for cancellation of interference from the other cells to limited addition. As a result, without needing complicated processing, it is possible to cancel interference from the other cells and improve throughput characteristics.

In the above-mentioned descriptions, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2010-136446 filed on Jun. 15, 2010, entire content of which is expressly incorporated by reference herein.

The invention claimed is:

1. A mobile station apparatus comprising:
a reception section configured to receive a reception signal including signal components from a plurality of base station apparatuses; and
a signal detection and channel estimation section configured to perform signal detection and channel estimation processing based on a factor graph on the reception signal,
wherein the signal detection and channel estimation section estimates interfering components from base station apparatuses of other cells except a desired base station apparatus included in the reception signal at a symbol level, and reuses the interfering components in the signal detection and channel estimation processing based on the factor graph.

2. The mobile station apparatus according to claim 1, wherein the signal detection and channel estimation section estimates a signal component from the desired base station apparatus included in the reception signal at a bit level, and reuses the signal component in the signal detection and channel estimation processing on the factor graph.

3. The mobile station apparatus according to claim 1, wherein the signal detection and channel estimation section cancels an interfering component from a first base station apparatus such that a position of a pilot signal is grasped among the base station apparatuses of other cells during a process of the signal detection and channel estimation processing based on the factor graph.

4. The mobile station apparatus according to claim 3, wherein the signal detection and channel estimation section limits the number of nodes based on a signal from the first base station apparatus among nodes constituting the factor graph.

5. The mobile station apparatus according to claim 3, wherein the signal detection and channel estimation section estimates and cancels an interfering component from a second base station apparatus such that a position of a pilot signal is not grasped among the base station apparatuses of other cells, based on correlation in the time domain and the frequency domain in a channel.

6. The mobile station apparatus according to claim 5, wherein the signal detection and channel estimation section standardizes Δ transfer nodes based on a signal from the second base station apparatus among nodes constituting the factor graph.

7. A signal detection and channel estimation method comprising:
receiving a reception signal including signal components from a plurality of base station apparatuses; and
performing signal detection and channel estimation processing based on a factor graph on the reception signal,
wherein interfering components from base station apparatuses of other cells except a desired base station apparatus included in the reception signal are estimated at a symbol level in the signal detection and channel estimation processing, and are reused in the signal detection and channel estimation processing based on the factor graph.

8. The signal detection and channel estimation method according to claim 7, wherein an interfering component from a first base station apparatus such that a position of a pilot signal is grasped among the base station apparatuses of other cells is canceled during a process of the signal detection and channel estimation processing based on the factor graph.

9. The signal detection and channel estimation method according to claim 8, wherein an interfering component from a second base station apparatus such that a position of a pilot signal is not grasped among the base station apparatuses of other cells is estimated from a noise component based on correlation in the time domain and the frequency domain in a channel, and is canceled.

* * * * *